(12) United States Patent
Rösseler et al.

(10) Patent No.: US 11,649,876 B2
(45) Date of Patent: May 16, 2023

(54) RESTRICTION FOR A VIBRATION DAMPER

(71) Applicant: ZF FRIEDRICHSHAFEN AG, Friedrichshafen (DE)

(72) Inventors: Jörg Rösseler, Ruppichteroth (DE); Aleksandar Knezevic, Eitorf (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 230 days.

(21) Appl. No.: 17/065,698

(22) Filed: Oct. 8, 2020

(65) Prior Publication Data

US 2021/0108699 A1 Apr. 15, 2021

(30) Foreign Application Priority Data

Oct. 10, 2019 (DE) ...................... 10 2019 215 558.8

(51) Int. Cl.
| | | |
|---|---|---|
| *F16F 9/34* | (2006.01) | |
| *F16F 9/19* | (2006.01) | |
| *F16F 9/512* | (2006.01) | |
| *F16F 9/58* | (2006.01) | |

(52) U.S. Cl.
CPC .............. *F16F 9/5126* (2013.01); *F16F 9/34* (2013.01); *F16F 9/19* (2013.01); *F16F 9/585* (2013.01); *F16F 2222/12* (2013.01); *F16F 2228/066* (2013.01); *F16F 2232/08* (2013.01); *F16F 2234/02* (2013.01)

(58) Field of Classification Search
CPC .... F16F 9/5126; F16F 9/34; F16F 9/19; F16F 9/585; F16F 2222/12; F16F 2228/066; F16F 2232/08; F16F 2234/02; F16F 9/50; F16F 9/49; F16F 9/486; F16F 9/368; F16F 9/3485
See application file for complete search history.

(56) References Cited

U.S. PATENT DOCUMENTS

| | | | | |
|---|---|---|---|---|
| 1,348,640 A | * | 8/1920 | Hachmann | F16J 9/18 29/888.07 |
| 2,111,291 A | * | 3/1938 | Mason | F16J 9/16 277/489 |
| 2,258,576 A | * | 10/1941 | Madsen | F16J 9/16 277/491 |

(Continued)

FOREIGN PATENT DOCUMENTS

| | | |
|---|---|---|
| DE | 102016210790 | 12/2017 |
| DE | 102017008752 | 3/2018 |

(Continued)

OTHER PUBLICATIONS

Office Action for the corresponding German Patent Application No. 10 2019 215 558.8.

*Primary Examiner* — Thomas J Williams
*Assistant Examiner* — James K Hsiao
(74) *Attorney, Agent, or Firm* — Cozen O'Connor

(57) ABSTRACT

A restriction for a vibration damper, comprising an annular element with variable diameter which is supported by a support and which occupies a restriction position depending on a flow velocity of a damping medium within the restriction proceeding from an open position through a radial closing movement in direction of a flow guiding surface. The annular element has at least two legs supported so as to be movable around a pivot bearing.

14 Claims, 10 Drawing Sheets

(56) References Cited

U.S. PATENT DOCUMENTS

| | | | | |
|---|---|---|---|---|
| 2,459,537 A * | 1/1949 | Oberstadt | F16F 7/09 188/129 |
| 2,670,255 A * | 2/1954 | Bergeron | F16J 9/16 277/494 |
| 2,768,865 A * | 10/1956 | Baker | F16J 9/14 277/494 |
| 3,633,763 A * | 1/1972 | Peterson | F16F 9/34 267/64.22 |
| 3,792,867 A * | 2/1974 | Bergeron | F16J 9/14 277/497 |
| 3,991,455 A * | 11/1976 | Bergeron | F16J 9/16 72/352 |
| 4,145,057 A * | 3/1979 | Wheeler | F16J 15/3212 277/553 |
| 4,592,558 A * | 6/1986 | Hopkins | F16J 15/3212 277/572 |
| 5,028,055 A * | 7/1991 | Rehfeld | F16J 9/206 277/476 |
| 5,513,858 A * | 5/1996 | Deely | F16J 15/3272 277/572 |
| 5,551,541 A * | 9/1996 | Forster | F16F 9/34 188/315 |
| 5,655,632 A * | 8/1997 | Valembois | F41A 25/12 89/44.01 |
| 5,727,794 A * | 3/1998 | Fauchon | F16J 15/3268 277/551 |
| 6,193,236 B1 * | 2/2001 | Helpap | F16J 9/206 277/494 |
| 6,378,872 B1 * | 4/2002 | Moriarty | F16J 9/16 277/435 |
| 6,672,575 B2 * | 1/2004 | Flower | F16F 7/085 267/134 |
| 9,133,933 B1 * | 9/2015 | Feistel | F16J 9/28 |
| 9,388,902 B2 * | 7/2016 | Sueyoshi | F16J 15/166 |
| 9,835,220 B2 * | 12/2017 | Kontny | F16F 9/49 |
| 10,323,712 B2 * | 6/2019 | Lizarraga Senar | F16F 9/348 |
| 2002/0000351 A1 * | 1/2002 | Valembois | F16F 7/09 188/166 |
| 2002/0104723 A1 * | 8/2002 | Obst | F16F 9/49 188/284 |
| 2003/0006562 A1 * | 1/2003 | Feistel | F16J 9/28 277/434 |
| 2003/0127802 A1 * | 7/2003 | Bennitt | F16J 9/16 277/493 |
| 2012/0136537 A1 * | 5/2012 | Galasso | B60G 17/015 267/218 |
| 2014/0020996 A1 * | 1/2014 | Litterscheid | F16F 9/5126 188/313 |
| 2014/0360353 A1 * | 12/2014 | Baalmann | F16F 9/49 92/143 |
| 2016/0046007 A1 * | 2/2016 | Touchette | B25B 27/12 29/224 |
| 2016/0091046 A1 * | 3/2016 | Soromenho | B60G 13/08 188/297 |
| 2017/0009840 A1 * | 1/2017 | Hertz | F16F 9/49 |
| 2019/0128361 A1 * | 5/2019 | Rösseler | F16F 9/5126 |
| 2019/0154104 A1 * | 5/2019 | Kontny | F16F 9/486 |

FOREIGN PATENT DOCUMENTS

| | | |
|---|---|---|
| WO | WO 9103781 | 3/1991 |
| WO | WO 2018155339 | 8/2018 |

* cited by examiner

RESTRICTION FOR A VIBRATION DAMPER

BACKGROUND OF INVENTION

1. Field of the Invention

The invention is directed to a restriction for a vibration damper.

2. Description of Related Art

A damping valve device that has an annular element with variable diameter which carries out a radial closing movement depending on a flow velocity within a restriction so that a cross section of the restriction is changed is known from DE 10 2016 210 790 A1.

The annular element has a transverse slit and is radially elastic. A limiting ring determines the maximum expansion of the annular element and additionally provides for a return movement of the annular element in direction of the initial position thereof in which the opening cross section of the restriction is also at a maximum.

In a damping valve device of this kind, the way that the annular element reacts to a changing flow situation decisively determines the quality of the damping valve device. In this regard, the reaction speed and the size of the minimum restriction cross section play an important role.

SUMMARY OF THE INVENTION

An object of one aspect of the present invention consists in further developing a generic damping valve device with respect to functional quality.

According to one aspect of the invention, an annular element comprises at least two legs, which are supported so as to be movable around a pivot bearing.

The great advantage over a radially elastic annular element with a single slit consists in that the influence of the radial elasticity is eliminated. In this way, the trigger point and the damping force characteristic can be adapted more precisely to requirements. Further, temperature influences or aging influences can no longer have such a substantial effect on the functioning of the annular element.

In a further configuration of the invention, the legs overlap in circumferential direction and the pivot bearing is formed in the area of overlap. The installation space needed for the pivot bearing can be minimized in this way.

In one embodiment form, it is provided that the support has a receiving opening for at least one bearing pin of the pivot bearing. This results in a defined support of the annular element in circumferential direction and in radial direction relative to the support.

In order to compensate for alignment errors inside of the pivot bearing, at least one bearing orifice can be formed in at least one leg as a groove extending in circumferential direction of the leg.

A further possibility for minimizing production errors which may influence the functioning of the pivot bearing can consist in that the two legs have a bearing orifice which is arranged, respectively, coaxial to an axis of the pivot bearing, and a groove side wall has a separate bearing pin that forms a bearing location with the bearing orifice of the leg facing it. Accordingly, there are two bearing locations which are arranged one above the other within the annular groove of the support.

In an alternative construction, the pivot bearing is formed independent from the support guiding the annular element. There is no need to form a bore hole in the support for a pivot bearing.

It can be provided, for example, that one leg has a first bearing location and the other leg has a second bearing location, and these two bearing locations form the pivot bearing. The bearing location is locked in axial direction when the two legs are inserted into the annular groove.

One variant is characterized in that the support has a separate supporting ring for the legs, and the support has a functional portion of the pivot bearing. The support accordingly has a base part and the additional supporting ring. In this case, no component parts of the pivot bearing need be formed in the base part.

In a further advantageous configuration, the functional portion is formed as a bearing pin.

The bearing pin is preferably formed by a ball because frictional forces and clamping forces are minimized in this case.

For purposes of a simple assembly, at least one leg can have a connection slot for the bearing orifice of the bearing location for implementing the bearing pin.

Bearing orifices in the support and in the legs can even be entirely dispensed with when the support has a rolling profile which, together with the lateral surfaces of the legs, forms the bearing location.

Regardless of the construction of the pivot bearing, the legs can extend over a dissimilar arc length. Accordingly, the expansion behavior of the annular element can be precisely controlled in order to prevent an abrupt reduction in cross section of the restriction.

BRIEF DESCRIPTION OF THE DRAWINGS

The invention will be described in more detail referring to the following description of the drawings. The drawings show.

DETAILED DESCRIPTION OF THE PRESENTLY PREFERRED EMBODIMENTS

Figure 1:
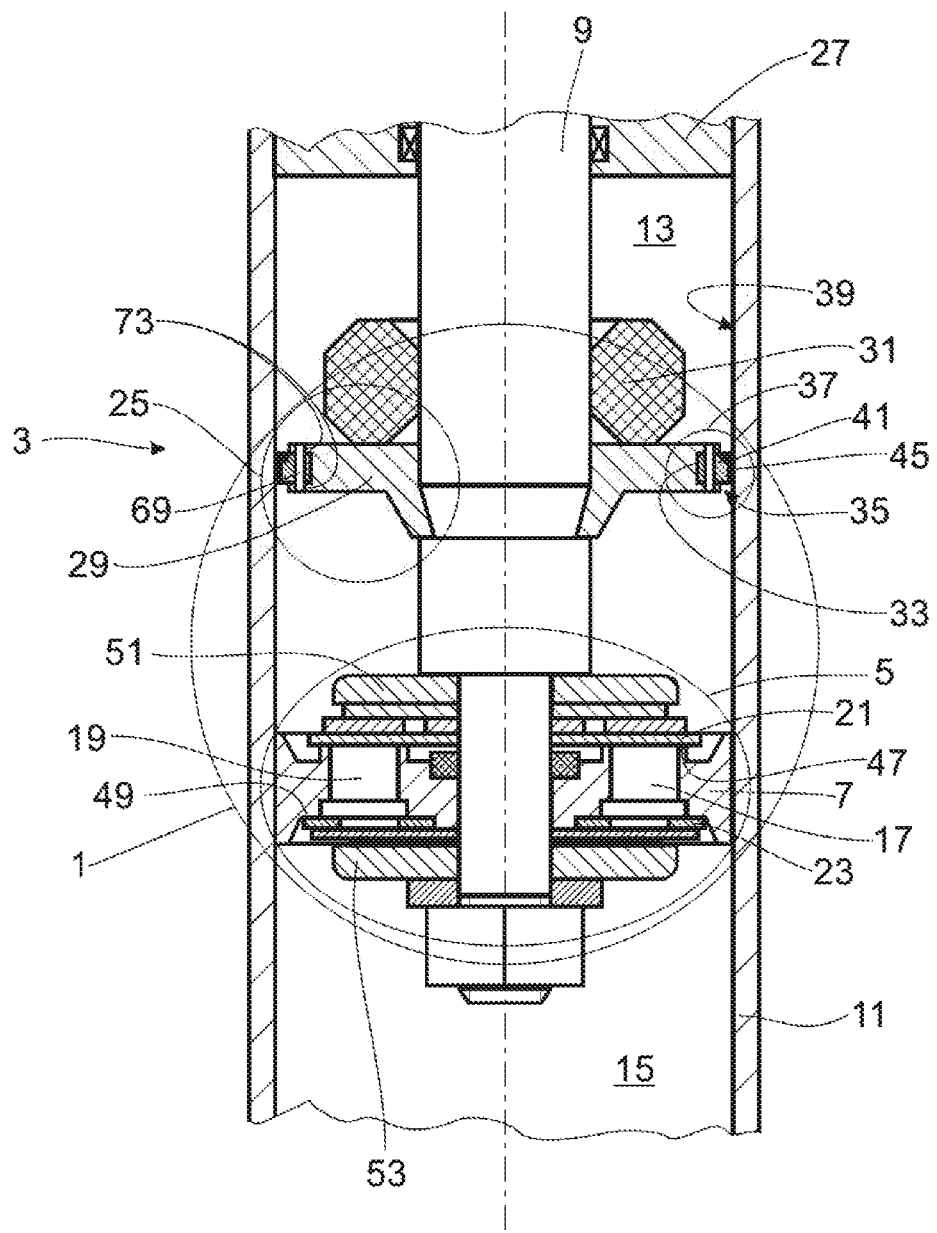
FIG. 1 is a section through a vibration damper in an area of the damping valve device.

FIG. 1 shows a damping valve device 1 for a vibration damper 3 of any constructional type, shown only partially. The damping valve device 1 comprises a first damping valve 5 with a damping valve body which is constructed as a piston 7 and fastened to a piston rod 9.

The damping valve body 7 divides a cylinder 11 of the vibration damper into a work chamber on the piston rod side and a work chamber remote of the piston rod, both work chambers being filled with damping medium. Through-channels are formed in the damping valve body 7 for a respective throughflow direction on different pitch circles.

The configuration of the through-channels is to be regarded as exemplary only. An outlet side of the through-channels 17; 19 is at least partially covered by at least one valve disk 21; 23.

Additionally, the vibration damper has a rebound stop 25 which makes contact with a cylinder-side stop surface, e.g., piston rod guide 27, starting from a defined extension movement of the piston rod 9.

The rebound stop 25 comprises a rebound stop disk as support 29 which is directly secured to the piston rod through a positive engagement connection. An annular elastomer element 31, for example, is placed on an upper side of the support 29 and is held via a slight radial preloading even during an oscillating movement of the piston rod 9. Onward from the stop point at the stop surface, the elastomer element 31 acts as additional supporting spring.

The support 29 has a circumferential groove 33 in which an annular element 35 with adjustable diameter is guided. This annular element 35 is radially elastic and forms a valve body for a restriction 37 as part of the damping valve device 1. The annular element 35 forms the restriction with an inner wall of cylinder 11, which inner wall 39 forms a flow guiding surface. In principle, the invention can also be formed in a support disk independent from the rebound stop.

The annular element has at the outer side thereof a limiting ring 41 which is constructed as a retaining ring.

At a piston rod velocity in a first operating range, e.g., less than 1 m/s, the restriction 37 is completely open. The damping force is then generated only by the through-channels 17; 19 in combination with valve disks 21; 23. With flow impinging on valve disks 21; 23, the valve disks 21; 23 lift from their valve seat surface 47; 49. The lifting movement is limited in each instance by a supporting disk 51; 53.

In a second operating range with a piston rod velocity greater than the limit velocity of the first operating range, i.e., greater than the 1 m/s which was indicated by way of example, the annular element 35 transitions into a restriction position and, in so doing, executes a closing movement in direction of the flow guiding surface 39. As a result of the high flow velocity of the damping medium in the restriction 37 which is shaped as an annular gap, a negative pressure forms leading to a radial expansion of the annular element 35. However, in order to preclude blockage of the restriction 37 the defined minimum cross-sectional opening area of the limiting ring 41 is observed.

Figure 2:
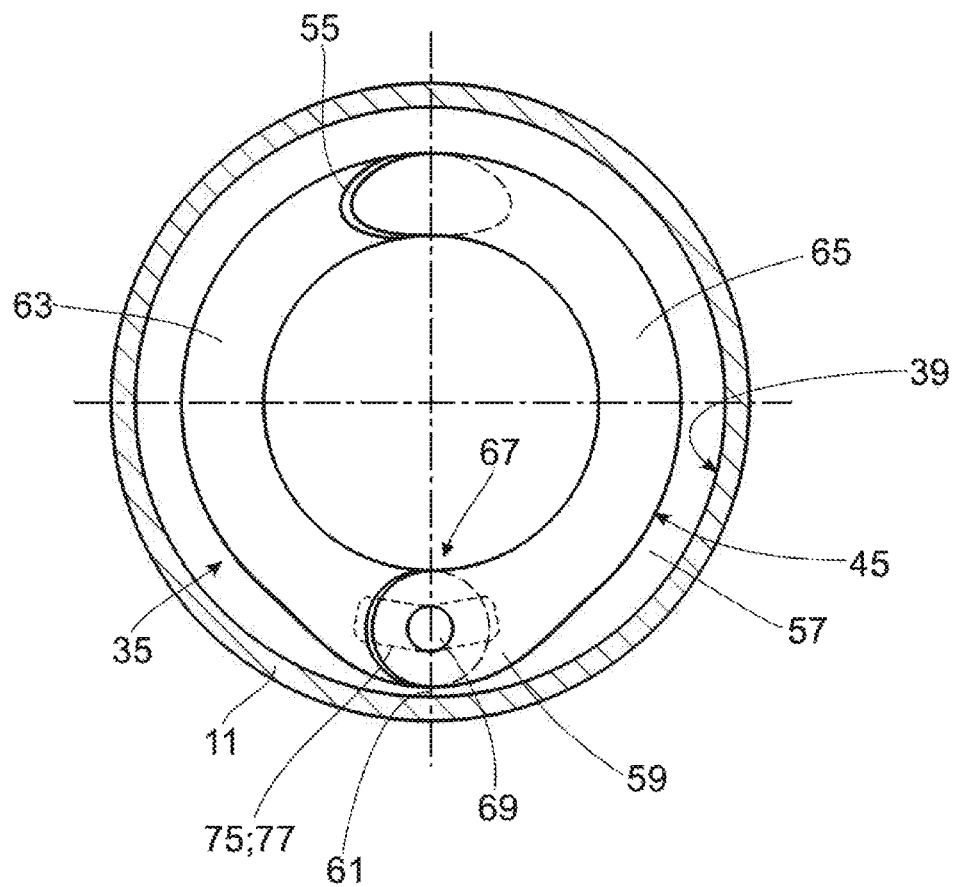
FIG. 2 is a top view of the annular element of the restriction according to FIG. 1.

In a cross section through the vibration damper 3 according to FIG. 1, FIG. 2 shows a top view of the annular element 35. The rebound stop disk as supporting element, the limiting ring 41 and the piston rod 9 are not shown for the sake of clarity. It will be seen that the annular element 35 has a transverse gap 55, which reduces the pressure force required for the radial expanding movement of the annular element 35. The annular element 35 is shown in the through position with minimum flow velocity. Consequently, the through cross section 57 is at a maximum. The through cross section 57 is determined by the inner wall 39 of the cylinder 11 and the outer lateral surface 45 of the annular element 35.

The annular element 35 has a profile 59 limiting the annular cross section between the annular element 35 and the inner wall 39 of the cylinder 11. In this diagram, the limiting profile 59 is formed as an individual radial projection at the lateral surface 45. This results in a C-shaped restriction cross section 57. Between the cam-like projection 59 and the inner wall 39, there is a restriction cross section 61, which is appreciably reduced in width and which is also maintained during a maximum expansion of the annular element 35. The radial projection 59 or limitation is dimensioned such that it influences a damping action only in the operating range of the restriction 37 (FIG. 1). Because of the relatively large circumferential area of the radial profile 59, the distance between the lateral surface 45 of the annular element 35 outside of the radial profile 59 may possibly be increased with the operating behavior remaining the same.

FIG. 2 further shows that the annular element 35 comprises at least two legs 63; 65 which are mounted so as to be movable around a pivot bearing 67. This feature is not dependent on the radial projection 59, but the two features complement one another advantageously in that the limiting profile 59 forms a part, e.g., a bearing pin 69, of the pivot bearing 67.

In this construction, the legs 63; 65 overlap in circumferential direction and the pivot bearing 67 is formed in the area of overlap. The two legs 63; 65 also overlap in the area of the transverse gap 55 in order to minimize a detrimental leakage cross section. As is shown in FIG. 1, the support 29 has two receiving openings 73 that receive the bearing pin 69. The receiving openings in the support 29 can be constructed, for example, as simple through holes. This applies also to the bearing orifices 75; 77. However, for a certain amount of play inside of the pivot bearing, it can also be provided that a bearing orifice 75; 77 is formed as a groove in circumferential direction of the leg.

With activated restriction, i.e., a correspondingly large flow velocity in the restriction cross section 57, the two legs 63; 65 of the annular element execute a radial swiveling movement around the pivot bearing 67 in direction of the inner wall of the cylinder 11. If the legs 63; 65 should make full surface contact, the restriction cross section 61 continues to remain open, which then determines the damping effect.

Figure 3:
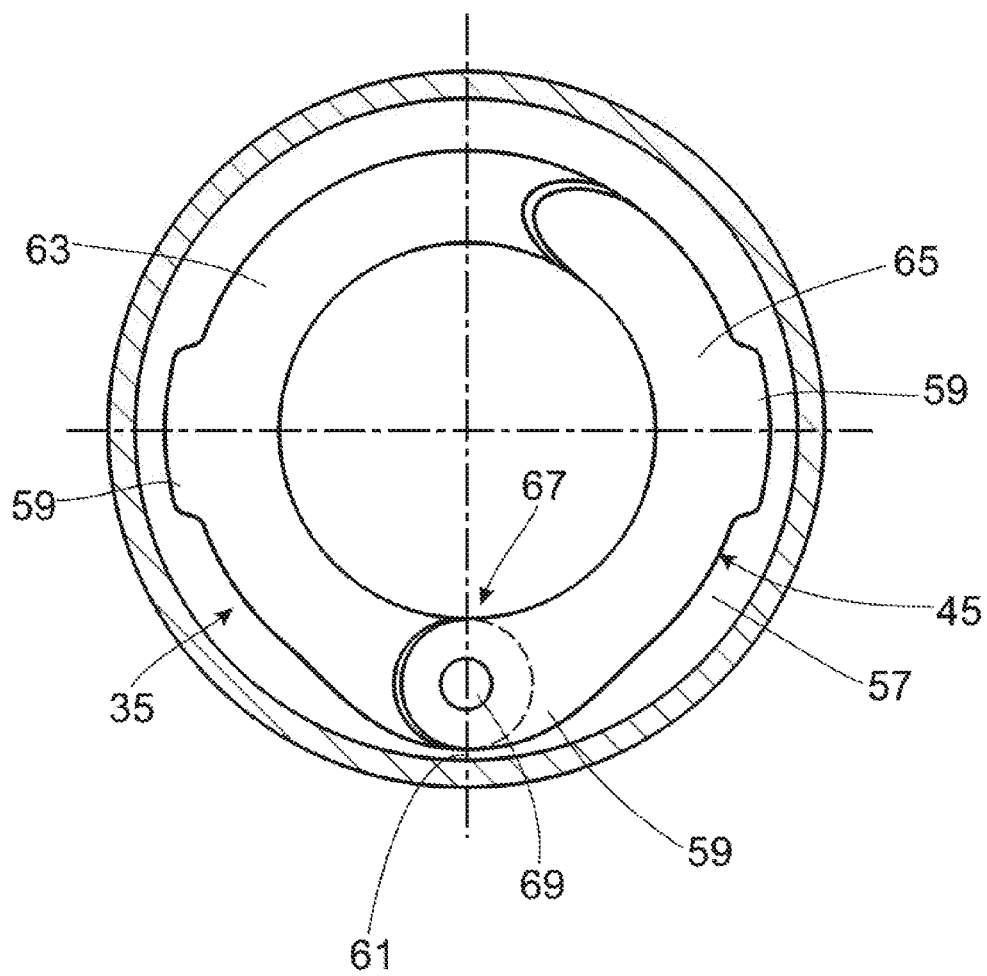
FIG. 3 is a top view of the annular element of the restriction according to FIG. 1.

In the construction of the annular element 35 according to FIG. 3 in the same viewing direction as in FIG. 2, it will be appreciated that the limiting profile 59 can also be formed by a plurality of radial projections 59 at the lateral surface 45. The radial projections 59 need not be constructed identically. The greater the distance of the projections 59 from the rotational axis of the pivot bearing 67, the less the radial extension should be so that the expansion path of the annular element 35 is not excessively limited.

Further, it is shown by way of example that the legs 63; 65 can extend over a dissimilar arc length. The expansion behavior and closing movement of the annular element 35 can be controlled via the arc length.

Figure 4:
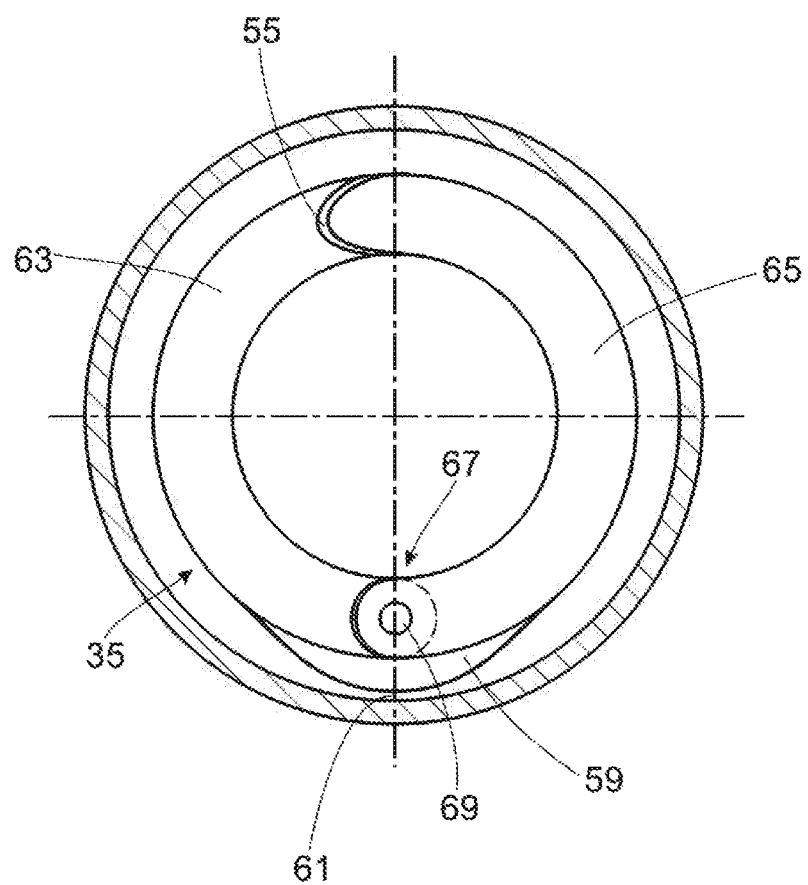
FIGS. 4 and 5 are an annular element comprising two axially stacked rings.
Figure 5:
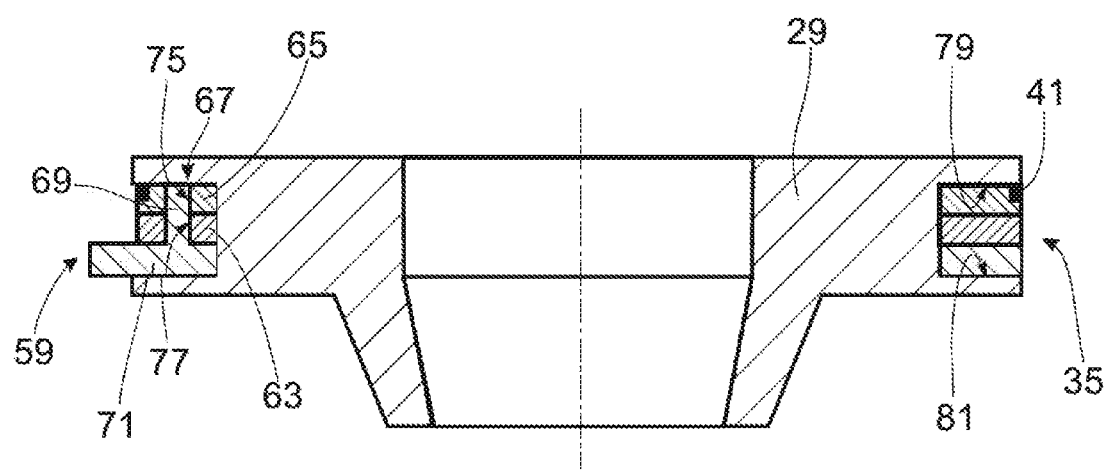

It will be appreciated from FIGS. 4 and 5 that the annular element 35 can also have two legs 63; 65 and a supporting ring 71. The supporting ring 71 also has the limiting profile 59. In this variant, the supporting ring 71 also forms a functional portion of the pivot bearing 67 in that the supporting ring 71 supports the axial bearing pin 69 which penetrates the two legs 63; 65 of the radially movable ring 35 in a bearing orifice 75; 77 in each instance. Accordingly, the pivot bearing 67 for the radially movable ring 71 and the limiting profile 59 axially overlap. Groove side walls 79; 81 of the support 29 axially close the pivot bearing 67 so that the legs 63; 65 cannot move out of the pivot bearing 67 under any circumstances. The pivot bearing 67 is formed independent from the support 29 guiding the annular element 35, i.e., the support 29 is not directly connected to a bearing pin, or has no bearing orifice for the bearing pin.

This annular element 35 functions in the identical manner described with reference to FIGS. 1 and 2.

Figure 6:
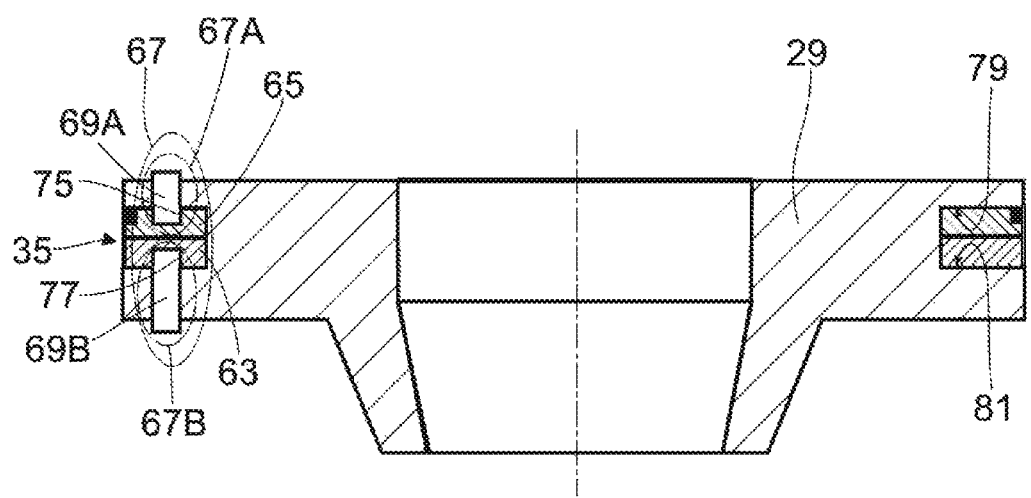
FIG. 6 is an annular element with two separate pivot bearings.

FIG. 6 shows a modification of the pivot bearing 67 at support 29 compared with the construction according to FIG. 1. The difference consists in that the two legs 63; 65 have the bearing orifice 75; 77 arranged coaxial to a rotational axis of the pivot bearing 69. A groove side wall 79; 81 has in each instance a separate bearing pin 69A; 69B which forms an independent bearing location 67A; 67B with the bearing orifice 75; 77 of the leg 63; 65 facing it. Therefore, the two legs 63; 65 can have a slight offset without significantly impairing the functioning of the radially expandable annular element 35.

Figure 7:
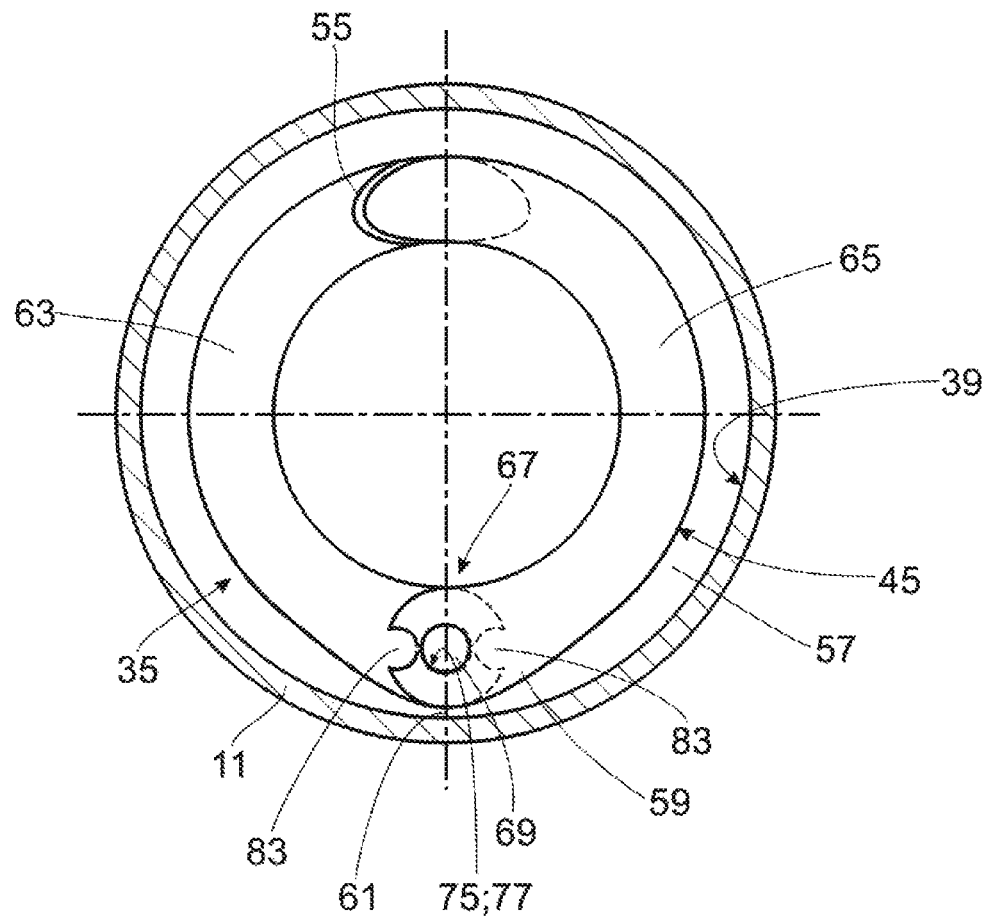
FIG. 7 is an annular element with a slit bearing orifice.

FIG. 7 shows a particular technique for fastening the legs 63; 65 to the bearing pin 69 of the pivot bearing 67. This fastening technique is applicable in all of the described variants with a bearing pin 69. In contrast to the other variants, the bearing orifice 75; 77 has a connection slot 83 from a lateral surface of the leg to the bearing orifice in at least one leg 63; 65. Accordingly, it is possible that the legs 63; 65 can be fitted laterally onto the bearing pin 69 during assembly in that the connection slot 83 expands elastically.

Figure 8:
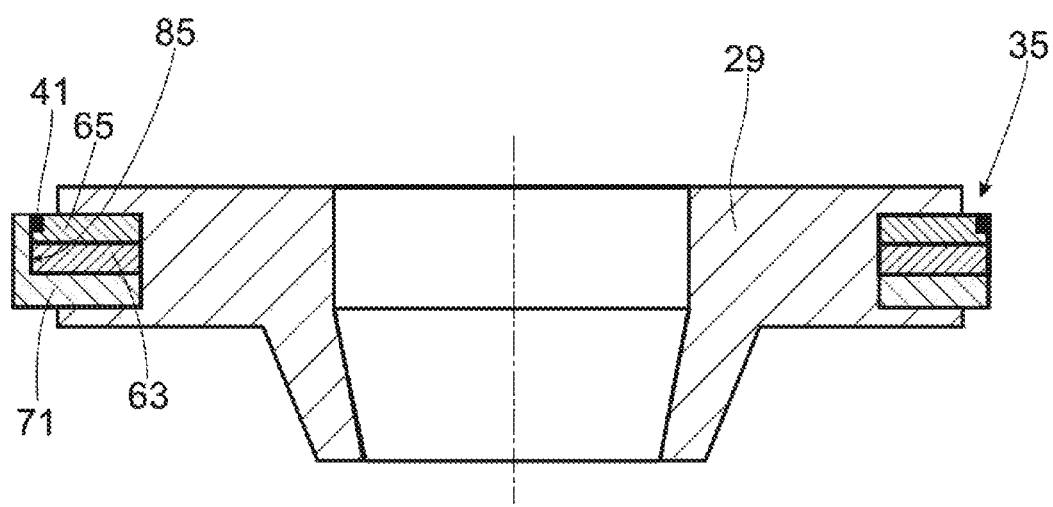
FIGS. 8 and 9 are an annular element with rolling profile as pivot bearing.
Figure 9:
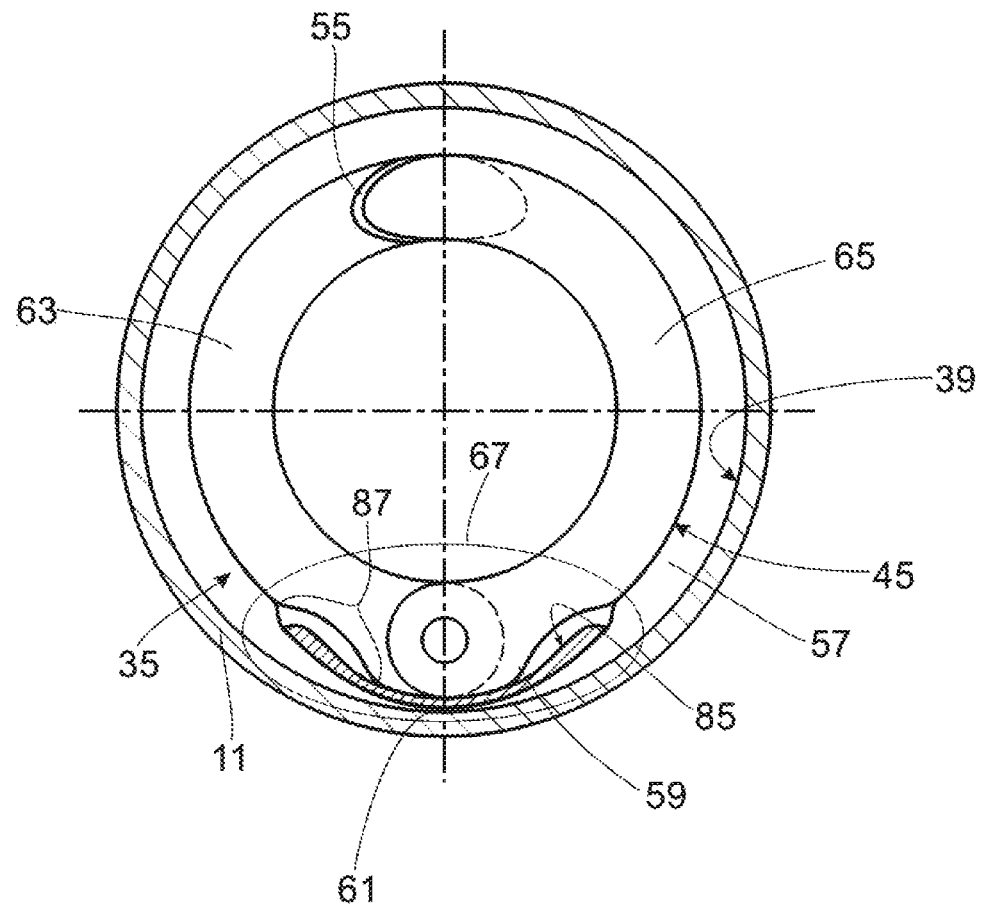

FIGS. 8 and 9 likewise show a variant in which the pivot bearing 67 is constructed independent from the support 29. To this end, the supporting ring 71, as functional portion of the pivot bearing 67, has a rolling profile 85 which forms the pivot bearing 67 with the lateral surface 45 of the annular element 35 or of the legs 63; 65. In the working area of the rolling profile, the lateral surface 45 can diverge from the annular shape with constant diameter and have a concave bearing region 87. The limiting ring 41 ensures that the legs 63; 65 can move toward one another only to a very limited extent in circumferential direction. Further, the rolling profile 85 has elements for preventing rotation of the legs 63; 65 and of the annular element 35.

Figure 10:
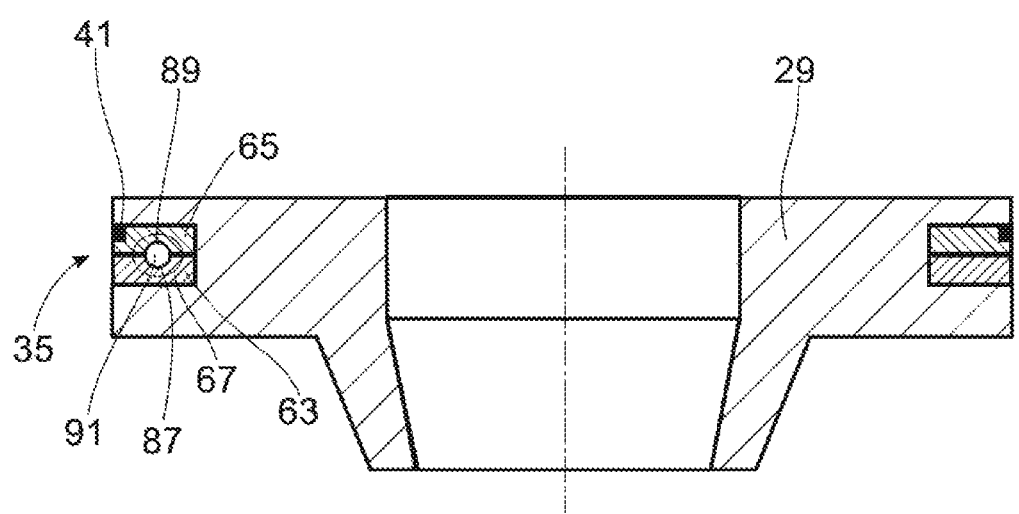
FIG. 10 is a pivot bearing with ball as bearing pin.

The construction according to FIG. 10 is likewise based on the idea that the support has no component parts of the pivot bearing. By way of substitution, leg 63 has a first bearing location 87 and the other leg 65 has a second bearing location 89, and these two bearing locations 87; 89 form the pivot bearing 67. Various geometrical shapes are possible for the bearing locations. For example, one bearing location can be formed as a trough and the other bearing location can be formed as a half-sphere. A play-free bearing can even be realized in this way. The two bearing locations 87; 89 are preferably shaped as troughs that form the bearing location with a separate ball. In this case also, the limiting ring 41 additionally provides for holding the component parts together.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A restriction for a vibration damper, comprising:
a support;
a pivot bearing; and
an annular element with a variable diameter which is supported by the support and which occupies a restriction position based on a flow velocity of a damping medium within the restriction proceeding from an open position through a radial closing movement in direction of a flow guiding surface,
wherein the annular element comprises at least two legs which are supported so as to be movable around the pivot bearing,
wherein the two legs are located next to each other and form a sealing element, and
wherein the sealing element has a transverse gap and an overlap with the pivot bearing separate from the transverse gap.

2. The restriction according to claim 1, wherein the at least two legs overlap in a circumferential direction and the pivot bearing is formed in an area of overlap.

3. The restriction according to claim 1, wherein the support has a receiving opening for at least one bearing pin of the pivot bearing.

4. The restriction according to claim 3,
wherein the at least two legs have a respective bearing orifice which is arranged, respectively, coaxial to an axis of the pivot bearing, and
wherein a groove side wall has a separate bearing pin that forms a bearing location with the bearing orifice of a respective leg facing groove side wall.

5. The restriction according to claim 1, further comprising a bearing orifice formed in at least one leg as a groove extending in a circumferential direction of the at least one leg.

6. The restriction according to claim 1, wherein the pivot bearing is formed independent from the support guiding the annular element.

7. The restriction according to claim 6, wherein one leg has a first bearing location and an other leg has a second bearing location, and these two bearing locations form the pivot bearing.

8. The restriction according to claim 1, wherein the support has a separate supporting ring for the at least two legs and a functional portion of the pivot bearing.

9. The restriction according to claim 8, wherein the functional portion is formed as a bearing pin.

10. The restriction according to claim 9, wherein the bearing pin is a ball.

11. The restriction according to claim 9, wherein at least one leg has a connection slot for a bearing orifice of a bearing location for implementing the bearing pin.

12. The restriction according to claim 1, wherein the support has a rolling profile which, together with respective lateral surfaces of the at least two legs, forms a bearing location.

13. The restriction according to claim 1, wherein the at least two legs extend over a dissimilar arc length.

14. A vibration damper comprising:
a piston rod;
a cylinder having a radially inner a flow guiding surface;
a first damping valve arranged in the cylinder with a damping valve body configured as a piston and fastened to the piston rod; and
a restriction comprising:
a support secured to the piston rod;
a pivot bearing; and
an annular element with a variable diameter which is supported by the support and which occupies a restriction position based on a flow velocity of a damping medium within the restriction proceeding from an open position through a radial closing movement in direction of the flow guiding surface,
wherein the annular element comprises at least two legs which are supported so as to be movable around the pivot bearing,
wherein the two legs are located next to each other and form a sealing element, and
wherein the sealing element has a transverse gap and an overlap with the pivot bearing separate from the transverse gap.

* * * * *